United States Patent Office 3,042,643
Patented July 3, 1962

3,042,643
COMPOSITION COMPRISING BUTYL RUBBER LATEX, STYRENE-BUTADIENE COPOLYMER LATEX, AND HYDRAULIC CEMENT
Frederick J. Foster, Cheshire, Conn., assignor to United States Rubber Company, New York, N.Y., a corporation of New Jersey
No Drawing. Filed Aug. 30, 1960, Ser. No. 52,766
8 Claims. (Cl. 260—29.7)

This invention relates to synthetic rubber latex and hydraulic cement compositions.

Various synthetic rubber latices have been added to hydraulic cement, such as Portland cement and aluminous cement, for use, with or without additional aggregate such as sand and gravel, in structures where the latex and cement composition must adhere strongly to such surfaces as concrete and glass. The difficulty is that such latex and hydraulic cement compositions made with a single synthetic rubber latex will not adhere well to both concrete and glass surfaces.

According to the present invention, a latex and hydraulic cement composition is provided that will adhere strongly to both concrete and glass surfaces.

In carrying out the present invention, two different types of synthetic rubber latex are added to the hydraulic cement, with added aggregate if desired, to give a latex and hydraulic cement composition that will strongly adhere to concrete and to glass. The two latices are Butyl rubber latex and SBR rubber latex. The two latices may be added separately to the hydraulic cement, or the two latices may be mixed together before addition to the hydraulic cement. It is surprising that a mixture of these two latices with a hydraulic cement, such as Portland cement, will give excellent adhesion to both concrete and glass, whereas the single Butyl rubber latex with Portland cement gives very poor adhesion to concrete and the single SBR latex with Portland cement gives relatively no adhesion to glass. Butyl rubber is a copolymer of 95 to 99.5 parts of isobutylene and correspondingly 5 to 0.5 parts of isoprene. Butyl rubber latex is prepared in known manner by emulsifying in water with the aid of conventional emulsifying agents a solution of Butyl rubber in a solvent, such as hexane, and thereafter removing the solvent to give the Butyl rubber latex. Such preparation of Butyl rubber latex is described in U.S. patent to Aldridge et al., No. 2,912,401, granted November 10, 1959, and U.S. patent to Brodkey et al., No. 2,936,295, granted May 10, 1960. The SBR rubber latex is an aqueous emulsion polymerizate of butadiene-1,3 and styrene. The SBR rubber of the SBR latex may be a copolymer of 75 to 30 parts of butadiene and correspondingly 25 to 70 parts of styrene.

The Butyl rubber latex and SBR rubber latex and hydraulic cement composition should contain a sufficient amount of stabilizer that is not inactivated by the calcium and aluminum in the hydraulic cement, as by precipitation by calcium and aluminum ions, so that the rubber of the latices is not prematurely coagulated on mixing the latices with the hydraulic cement. Such stabilizers may be non-ionic surface-active agents selected from the well-known classes:

(1) Monoethers of the polyglycols with long chain fatty alcohols, such as reaction products of ethylene oxide or polyethylene glycol with a long chain fatty alcohol (e.g. reaction product of ethylene oxide and oleyl alcohol, viz:

$$C_{18}H_{35}—(OC_2H_4)_nOH$$

where $n$ is 8 to 20).

(2) Monoesters of polyglycols with long chain fatty acids, such as reaction products of ethylene oxide or polyethylene glycol with a long chain fatty acid (e.g. reaction product of ethylene oxide or polyethylene glycol with oleic acid, viz:

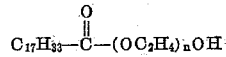

where $n$ is 8 to 20).

(3) Monoethers of polyglycols with alkylated phenols, such as reaction products of ethylene oxide or polyethylene glycol with an alkyl phenol (e.g. reaction product of ethylene oxide and isopropyl phenol, viz:

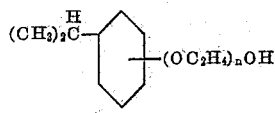

where $n$ is 8 to 20).

The amount of stabilizer generally will be from 3 to 20 parts per 100 parts of the rubber content of the Butyl rubber and SBR rubber latices. The stabilizer may be added to the latices or mixture of latices, or part of the stabilizer may be contained in the latices from their preparation and part added to the latices or mixture of latices, or all the stabilizer may be contained in the latices from their preparation.

The ratio of the Butyl rubber to SBR rubber in the latex and hydraulic cement composition may be in the range from 3:1 to 1:3 and is preferably about 1:1. The latices or mixture of latices will generally have a concentration of 25% to 60% rubber solids. The water from the latices and any other water that is added will be in amount to give the desired ratio of water to hydraulic cement to satisfy the needs of the cement as in common practice. The amount of Butyl rubber and SBR rubber in the latex and hydraulic cement composition will be from 5 to 25 parts rubber solids per 100 parts of the hydraulic cement. For some purposes, such as prime or wash coats, or grout coats between interfaces, no aggregate will be included in the latex and hydraulic cement composition. For other building purposes, up to 500 parts of aggregate, which is usually sand or sand and gravel, per 100 parts of the hydraulic cement may be included. Generally 100 to 300 parts of aggregate per 100 parts of the hydraulic cement will be used.

The following examples illustrate the invention. All parts and percentages referred to herein are by weight.

*Example 1*

This is an example of field use of the present invention.

A mixture of a commercial Butyl rubber latex, the Butyl rubber content of which is a copolymer of 95 to 99.5 parts of isobutylene and correspondingly 5 to 0.5 parts of isoprene, and a commercial SBR rubber latex, the SBR rubber content of which is a copolymer of approximately 40 parts of butadiene and 60 parts of styrene, is mixed with a ratio of Butyl rubber to SBR rubber of approximately 1:1, and a solids concentration of the mixture of latices of about 50%. There is added to the mixture of latices 5 parts of a commercial non-ionic surface-active agent per 100 parts of rubber content as a stabilizer. The surface-active agent is the reaction product of the ethylene oxide and isooctylphenol having the formula

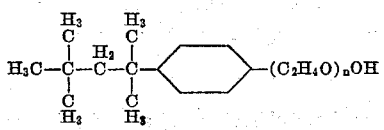

where $n$ is 9 to 10. The mixture of latices is diluted with an equal volume of water, giving a latex composition containing about 1 pound of Butyl rubber and 1 pound of SBR rubber per gallon of the latex composition.

3.5 to 5.5 gallons of this diluted latex composition is mixed with each 94 pound sack of Portland cement to give a latex and Portland cement composition containing about 7 to 11 parts of the mixture of rubbers per 100 parts of the Portland cement. Sand is added to give the desired ratio of aggregate to Portland cement, viz. 1:1 to 3:1.

*Example 2*

To show the great difference in adhesion to concrete and glass of latex and Portland cement compositions made with Butyl rubber latex, SBR rubber latex, and mixtures of Butyl rubber and SBR rubber latices, separate compositions were prepared similarly to Example 1 with contents of 10 parts of rubber solids of Butyl rubber latex, 10 parts of an SBR rubber latex of a copolymer of about 60 parts of butadiene-1,3 and 40 parts of styrene, and 10 parts of a mixture of the Butyl rubber latex and the SBR rubber latex in a ratio of Butyl rubber to SBR rubber of 1:1, to a mixture of 100 parts of Portland cement and 100 parts of aggregate, viz., sand. The adhesion of each of these latex and Portland cement compositions to concrete and to glass were measured by an adhesion test as follows:

A mold with a cavity in the shape of a dog bone with a cross sectional area of one square inch at the center is used. For testing the adhesion of the latex and Portland cement composition to concrete, a previously prepared concrete section in the shape of one-half the mold is inserted in the mold. The latex and Portland cement composition to be tested is poured into the other open half of the mold. After hardening, the complete dog bone shaped piece is removed from the mold, wet cured for seven days as in usual practice, and then air dried for 21 days prior to testing. The test piece is then placed between jaws and the pounds force required to rupture the bond at the interface of the preformed concrete section and the poured section of the latex and Portland cement composition is measured, and this represents the adhesion value in pounds per square inch. The machine used to measure the force or pull required to rupture the bond is a Tinius Olson Lo-Cap Universal testing machine. For testing the adhesion of the latex and Portland cement composition to glass, a piece of glass is inserted in the center of the mold and the latex and Portland cement composition is poured in both open halves of the mold and in contact with the opposite surfaces of the glass insert. After hardening the complete bone shaped piece with the glass insert at the center is removed from the mold, cured for seven days, and then air dried for 21 days, after which the force required to rupture the bond at an interface of the glass on a poured section of the latex and Portland cement composition is measured as above described.

The adhesion values in pounds per square inch of the various latex and Portland cement compositions to concrete and to glass are shown in the following table, the figures being averages.

| Latex | Adhesion (p.s.i.) to | |
|---|---|---|
| | Concrete | Glass |
| Butyl rubber latex | 120 | 26 |
| SBR rubber latex | 271 | Nil |
| Mixed butyl rubber latex and SBR rubber latex | 269 | 21 |

It is clear from the above that the mixture of Butyl rubber latex and SBR rubber latex in a latex and hydraulic cement composition has greatly superior adhesion characteristics to concrete and glass than either latex alone.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A latex and hydraulic cement composition comprising 5 to 25 parts solids of latices of Butyl rubber and SBR rubber per 100 parts of hydraulic cement, the ratio of Butyl rubber to SBR rubber being in the range of 3:1 to 1:3, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

2. A latex and hydraulic cement composition comprising 5 to 25 parts solids of latices of Butyl rubber and SBR rubber per 100 parts of hydraulic cement, the ratio of Butyl rubber to SBR rubber being in the range of 3:1 to 1:3, said composition containing up to 500 parts of aggregate per 100 parts of hydraulic cement, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

3. A latex and hydraulic cement composition comprising 5 to 25 parts solids of latices of Butyl rubber and SBR rubber per 100 parts of hydraulic cement, the ratio of Butyl rubber to SBR rubber being in the range of 3:1 to 1:3, said composition containing 100 to 300 parts of aggregate per 100 parts of hydraulic cement, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

4. A latex and hydraulic cement composition comprising 5 to 25 parts solids of latices of Butyl rubber and SBR rubber per 100 parts of hydraulic cement, the ratio of Butyl rubber to SBR rubber being in the range of 3:1 to 1:3, said composition containing about 100 parts of aggregate per 100 parts of hydraulic cement, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

5. A latex and hydraulic cement composition comprising about 10 parts solids of latices of Butyl rubber and SBR rubber per 100 parts of hydraulic cement, the ratio of Butyl rubber to SBR rubber being about 1:1, said Butyl rubber being a copolymer of 95 to 99.5 parts isobutylene and correspondingly 5 to 0.5 parts of isoprene, and said SBR rubber being a copolymer of 75 to 30 parts of butadiene-1,3 and correspondingly 25 to 70 parts of styrene.

6. A latex and hydraulic cement composition comprising about 10 parts solids of latices of Butyl rubber and SBR rubber per 100 parts of hydraulic cement, the ratio of Butyl rubber to SBR rubber being about 1:1, said composition containing up to 500 parts of aggregate per 100 parts of hydraulic cement, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

7. A latex and hydraulic cement composition comprising about 10 parts solids of latices of Butyl rubber and SBR rubber per 100 parts of hydraulic cement, the ratio of Butyl rubber to SBR rubber being about 1:1, said composition containing 100 to 300 parts of aggregate per 100 parts of hydraulic cement, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

8. A latex and hydraulic cement composition comprising about 10 parts solids of latices of Butyl rubber and SBR rubber per 100 parts of hydraulic cement, the ratio of Butyl rubber to SBR rubber being about 1:1, said composition containing about 100 parts of aggregate per 100 parts of hydraulic cement, said Butyl rubber being a copolymer of 95 to 99.5 parts of isobutylene and correspondingly 5 to 0.5 parts of isoprene, and said SBR rubber being a copolymer of 75 to 30 parts of butadiene-1,3 and correspondingly 25 to 70 parts of styrene.

References Cited in the file of this patent
UNITED STATES PATENTS 2,662,064    Mead ------------------- Dec. 8, 1953